Dec. 16, 1958
C. U. GRAMELSPACHER
2,864,425
INNER LINER FOR TUBELESS TIRE
Filed Feb. 15, 1956
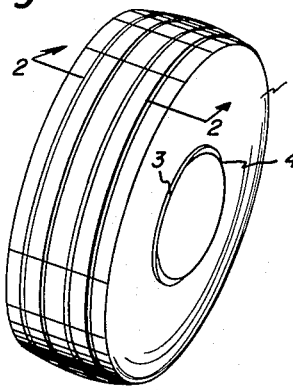
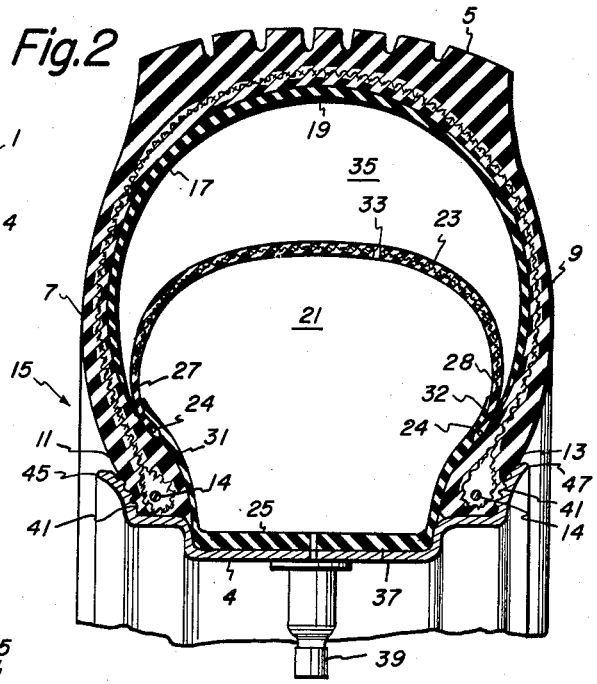
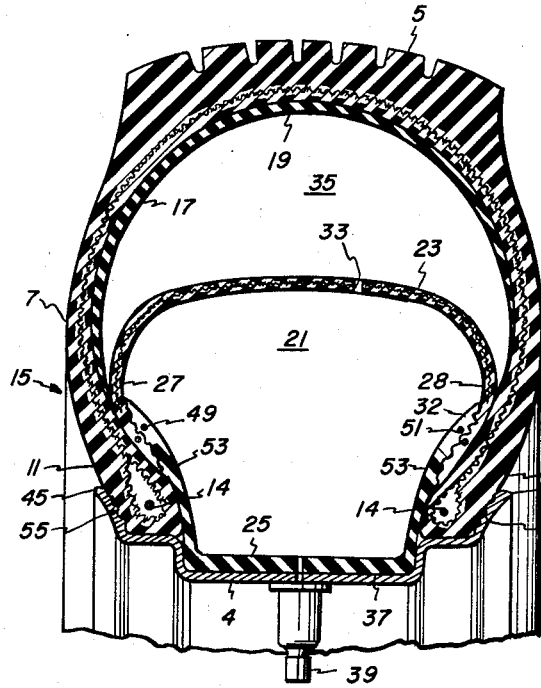
INVENTOR.
CLARENCE U. GRAMELSPACHER
BY
Attorneys United States Patent Office 2,864,425
Patented Dec. 16, 1958

2,864,425

INNER LINER FOR TUBELESS TIRE

Clarence U. Gramelspacher, Jasper, Ind.

Application February 15, 1956, Serial No. 565,693

3 Claims. (Cl. 152—341)

My present invention relates to a tubeless pneumatic tire and more particularly to a tire construction having a removable inner liner.

This application is a continuation-in-part of my application Serial No. 307, 439, now abandoned.

Tires of the blow-out proof design as presently constructed are dependent for their inflation upon the establishment of an air tight seal between the tire rim and the bead of the tire. In such construction the rim itself forms a boundary of the air space and difficulty is experienced in developing sufficient internal pressure to force the tire bead against the rim during inflation. Consequently large volumes of air pass out between the tire and rim and unless the air supply is of sufficient volume to fill the air spacing faster than the air escapes the tire cannot be inflated; to overcome this condition mechanical manipulation of the tire beads and rim is frequently necessary before a sufficient seal may be attained to permit inflation. Even under conditions where a large flow of air is attainable the looseness of the uninflated tire on the rim necessitates that an excessive quanttiy of air must be used due to the high escapage at the rim flanges.

This invention contemplates the provision of a tubeless tire structure which overcomes the above noted defect by providing means which assist in the development of tire pressure during inflation.

Further, as more particularly described hereinafter, the elements constituting a new elastic air retention chamber of this novel tire are readily removable from the tire casing without detriment thereto.

It is accordingly a primary object of this invention to describe a tubeless pneumatic tire which is readily inflatable and comprises a diaphragm and cooperating liner.

It is a particular object of this invention to describe a tubeless pneumatic tire having a removable, inflatable inner chamber.

It is a further object of this invention to describe a blow-out proof tubeless pneumatic tire having an inflatable chamber of two-piece construction, each of which pieces may be removable from the tire casing.

These and other allied objectives of the invention are attained by providing internally of the carcass of a tubeless tire an inflatable elastic chamber comprising a diaphragm and liner. This diaphragm extends between the tire bead portions and the liner side walls which extend over the opposed ends of the diaphragm and spans the space between the bead portions.

The liner is further provided with a toe portion in which a valve is mounted which in turn passes through an opening in the tire rim. Thus, coincident with the application of air to the inflatable chamber formed by the diaphragm and liner, pressure is exerted upon the contiguous beads through the toe forcing the beads against the tire rim.

The diaphragm of the elastic chamber may have the ends thereof permanently sealed adjacent the tire bead shoulders as by the application of rubber cement therebetween, or may in the inflated condition of the tire be temporarily sealed between the said shoulders and extending flares of the liner. Thus the diaphragm and liner may each be removed from the tire carcass without detriment thereto. In instances where the removable diaphragm is employed it is desirable to reinforce the diaphragm ends with wire as will be more particularly described hereinafter.

The liner formed of rubberized fabric or rubber is of a diameter to snugly fit the tire rim, being shaped in the form of a cup in cross section with flared side wall portions which embrace the lower ends of the diaphragm. The toe or base portion of the liner preferably is somewhat thicker in cross section than the flared side wall portions, as such a structure assists in holding the liner in sealing position with respect to the diaphragm.

The outer walls of the flared portions may be provided with protuberances such as ribs, nodules, a sealant or other pressure sealing means to assist in attaining the intimate engagement required between the flared side wall portions and the bead shoulders. Reinforcement may also be provided in the flared portions to assist in the attainment of rigidity. The diaphragm, as illustrated on the drawings, consists of a rubberized fabric, rubberized cord fabric or rubber of sufficient strength and imperviousness to contain the required volume of air.

Preferably the inner and outer faces of the tire beads are also provided with protuberances such as ribs, nodules or other pressure sealing means to assist in the rapid development of air tight seals between the various components, as for example, between the rim and the outer face of the tire bead and between the tire beads and the toe of the liner.

The invention will be more fully understood by reference to the following detailed description and accompanying drawings wherein:

Figure 1 is a perspective view of a tire and rim embodying the teachings of this invention;

Figure 2 is a sectional view taken on the line 2—2 of Figure 1;

Figure 3 is a sectional view similar to Figure 2 and illustrating a reinforced liner in association with a tire and bead portions of a tire each having compressible sealing means;

Figure 4 is an enlarged sectional view of the liner of Figure 2;

Figure 5 is an enlarged sectional view of the liner of Figure 3; and

Figure 6 is an enlarged sectional view of the liner provided with compressible nodules or ribs.

Referring to the drawings there is shown in Figure 1 a pneumatic tire 1 of tubeless construction mounted on a conventional tire rim 3 having a felly portion 4 (Figure 2).

Tire 1 as shown more clearly in Figure 2 comprises a carcass having a tread 5, sidewalls 7, 9, and bead portions 11, 13, which latter may be suitably provided with wire reinforcing as at 14. The outer surface 15 is rubberized in the conventional manner and the inner wall is provided with a layer of air impervious material 17, such as butyl rubber to render the carcass airtight. A crown of a puncture proof sealant 19, e. g., a soft plastic adhesive rubber mass, is provided on the inner wall adjacent tread 5 and serves to make the casing puncture proof.

An inflatable inner chamber, designated 21, is formed by the diaphragm 23 and liner 25. The diaphragm, as illustrated in the drawings, is constructed of rubberized fabric or the like reinforced elastic material to form a restricted inflatable chamber within the tire. The liner also may be constructed of rubberized fabric or rubber. When made of rubber, as illustrated in the drawings, the toe portion is made sufficiently thick to give it the desired stiffness so that the liner fits tightly on the tire rim, as illustrated in Figures 2 and 3. The chamber 21, as illustrated in Figure 2, is closed by the end side wall portions 27 and 28 of the diaphragm 23, the side wall portions being secured to the casing or carcass inner wall at the shoulders of the beads 11, 13 respectively. Flare portions 31, 32 of liner 25 extend over the end wall portions 27, 28 and in the inflated condition of chamber 21 are sealed thereto in airtight relationship.

Diaphragm 23 is vented as at 33, to an outer chamber 35. This chamber is defined by the airtight layer 17, including sealant 19, and the diaphragm 23, since the latter, as illustrated, is sealed to the inner side walls of the tire carcass. Further, the diaphragm 23 may be provided with circumferential wires which stiffen the shoulders and spring the end wall portions 27 and 28 outward to thereby assist in sealing the same against the inner side walls of the tire.

In a toe portion 37 of the liner 25 there is mounted a valve 39 through which air is admitted to the tire to inflate the same. The valve stem of the valve 39 extends through rim felly portion 4 and in the inflated condition of liner 25 the same is pressed into intimate contact with the tire bead portions 11, 13, which in turn, are retained by the rim 4, thus effecting airtight seals therebetween.

The exterior faces 41, 43 of beads 11, 13 respectively, engage rim flanges 45, 47 of rim 3 and upon application of air to chamber 21 the beads are forced into engagement with the flanges. Sealing of the liner to the diaphragm permits air pressure to be built up in chamber 21 before a like pressure has been established in the outer chamber 35.

In the embodiment of the invention illustrated in Figure 3, the diaphragm 23 is not sealed permanently to the shoulder or inner side walls of the tire carcass at the bead portions being removable therefrom as desired for replacement or repair. Sealing of the flared end portions of the diaphragm against the shoulders of the tire is effected by the pressure exerted on the flare portions 31, 32 which in this instance may be reinforced as by the use of wires 49 and 51 which extend completely around the liner.

Also as shown in Figure 3, liner comprises side walls 53 and a toe or base portion 37, the latter being of greater thickness than the side walls. Preferably the walls 53 of the liner taper smoothly into flared extremities as at 32. This added wall thickness of the toe portion 37 improves the rigidity of the structure, particularly where the liner is made of rubber, and assists in the positioning of the liner in air sealing engagement with the diaphragm.

It will also be noted that in Figure 3 the outer faces of the bead portions of the tire are provided with nodules 55 of a deformable material, e. g., rubber or rubberized fabric, which aids in sealing the bead portions of the tire against the rim. That is, the lateral pressure exerted through the toe forces the beads and nodules 55 against the rim and such action is effective to attain proper mounting and sealing of the tire to the rim.

Figures 4, 5 and 6 are sectional views illustrating various embodiments of the structure of the liner. Thus it will be noted that the liner of Figure 4 is similar to that shown in Figure 2, while the liner of Figure 5 is reinforced similar to that of Figure 3, and is further provided with compressible ribs 57.

In Figure 6 a similar liner is shown which is provided with nodules of compressible material 59 for readily securing the side walls of the liner with the shoulders of the carcass.

Where desired, a sealant, e. g. soft plastic adhesive mass of natural or synthetic rubber, may replace the nodule or rib sealing means or may be used in conjunction therewith. A deformable plastic rubber mass, for example, will permit sealing under pressure and at the same time will allow removal and separation of the elements upon release of air from the tire.

In mounting the tire structure of the invention preferably the diaphragm if removable is first placed within the carcass and the liner is thereafter inserted with the flared side wall portions extending over the diaphragm ends. This assembly is then mounted over tire rim 3 with the air valve extending through felly rim 4 similarly as in the mounting of conventional tires.

The outer faces of the bead portions are mounted flush with the rim as is consistent with the rigidity and surface contour of the bead portions and thereafter air pressure is applied to the inflated chamber through the valve. Sealing will be effected between the flare portions of the liner and the diaphragm ends due to the flexibility of the flared portions which are in overlapping engagement. The toe portion of the liner fits tightly against the rims and in airtight relationship therewith.

This effective sealing as provided by the liner facilitates mounting and inflation of the tire and results in savings of air and power in tire inflation as well as insuring uniform tire mounting.

It will be understood that this invention is susceptible to modification in order to adapt it to different usages and conditions and accordingly, it is desired to comprehend such modifications within this invention as may fall within the scope of the appended claims.

What is claimed is:

1. A tubeless pneumatic tire for mounting on a rim, said tire having a tread portion, side walls, and spaced bead portions, the outer faces of said bead portions being provided with nodules of rubberized fabric for sealing the bead portions to said rim, an open-ended rubberized fabric diaphragm arranged in said tire and dividing the same into inner and outer inflatable chambers, said diaphragm comprising flared side wall portions for engaging and sealing said diaphragm to the inner wall of said tire, a rubberized liner which is cup-shaped in cross section and having a toe and flared side wall portions for positioning in said tire closing the open end thereof, flared side wall portions of said liner being arranged to overlie the flared side wall portions of said diaphragm, and a valve stem mounted on said toe and extending therethrough for passing air to said inflatable chambers, said flared side wall portions of said liner and said diaphragm comprising interlocking compressible ribs on the inner engaging faces thereof for sealing the diaphragm and liner, said toe portion of the liner being of substantially greater thickness than said side wall portions to assist in positioning of the liner in the tire.

2. A tubeless pneumatic tire for mounting on a rim, said tire having a tread portion, side walls, and spaced bead portions, the outer faces of said bead portions being provided with nodules of rubberized fabric for sealing the bead portions to said rim, an open-ended rubberized fabric diaphragm arranged in said tire and dividing the same into inner and outer inflatable chambers, said diaphragm comprising flared side wall portions for engaging and sealing said diaphragm to the inner wall of said tire, a rubberized fabric liner which is cup-shaped in cross section and having a toe and flared side wall portions for positioning in said tire closing the open end thereof, flared side wall portions of said liner being arranged to overlie the flared side wall portions of said diaphragm, all of said flared portions containing endless reinforcing wires, and a valve stem mounted in said toe and extending therethrough for passing air to said inflatable chambers, said flared side wall portions of said liner and said diaphragm comprising interlocking compressible ribs on the inner engaging faces thereof for sealing the diaphragm and liner, said toe portion of the liner being of substantially greater thickness than said side wall portions to assist in positioning of the liner in the tire.

3. A tubeless pneumatic tire for mounting on a rim, said tire having a tread portion, side walls, and spaced bead portions, the outer faces of said bead portions being provided with nodules of rubberized fabric for sealing the bead portions to said rim, an open-ended rubberized fabric diaphragm arranged in said tire and dividing the same into inner and outer inflatable chambers, said diaphragm comprisinfi flared side wall portions for engaging and sealing said diaphragm to the inner wall of said tire, a rubberized liner which is cup-shaped in cross section and having a toe and flared side wall portions for positioning in said tire closing the open end thereof, flared side wall portions of said liner being arranged to overlie the flared side wall portions of said diaphragm, all of said flared portions containing endless reinforcing wires, and a valve stem mounted on said toe and extending therethrough for passing air to said inflatable chambers, said flared side wall portions of said liner and said diaphragm comprising interlocking compressible ribs on the inner engaging faces thereof for sealing the diaphragm and liner, said liner being of a thickness to provide rigidity to the same to thereby assist in positioning the liner in the tire.

References Cited in the file of this patent

UNITED STATES PATENTS

| | | |
|---|---|---|
| 1,889,799 | Clark | Dec. 6, 1932 |
| 2,074,284 | Stevenson | Mar. 16, 1937 |
| 2,554,815 | Church | May 29, 1951 |
| 2,587,470 | Herzegh | Feb. 26, 1952 |

FOREIGN PATENTS

| | | |
|---|---|---|
| 101,795 | Great Britain | July 19, 1917 |
| 1,100,829 | France | Apr. 13, 1955 |

(Corresponding English Patent No. 733,936)

| | | |
|---|---|---|
| 733,936 | Great Britain | July 20, 1955 |